United States Patent [19]
Kawaguchi

[11] 3,789,959
[45] Feb. 5, 1974

[54] APPARATUS FOR AUTOMATIC PAD ADJUSTMENT IN DISK BRAKES
[75] Inventor: Takeski Kawaguchi, Tokyo, Japan
[73] Assignee: Honda Giken Kogyo Kabushiki Kaisha, Tokyo, Japan
[22] Filed: Aug. 28, 1972
[21] Appl. No.: 284,458

[30] Foreign Application Priority Data
Aug. 28, 1971 Japan.............................. 46-65567

[52] U.S. Cl.......... 188/71.9, 188/72.8, 188/196 BA
[51] Int. Cl............................................ F16d 65/56
[58] Field of Search........ 188/26, 71.9, 72.8, 106 F, 188/196 BA

[56] References Cited
UNITED STATES PATENTS
3,211,263  10/1965  Harrison ....................... 188/71.9 X
3,709,333  1/1973  Buyze ............................... 188/71.9

Primary Examiner—Duane A. Reger
Attorney, Agent, or Firm—Eric H. Waters et al.

[57] ABSTRACT

A disk brake of the type in which a caliper member extends over a brake disk and is provided, on opposite inner surfaces, with a stationary pad and a movable pad, the latter being arranged to be advanced by being pushed upon pivoting of an operation lever. An automatic pad adjustment apparatus is provided for compensation of wear of the pads and the movable pad is so arranged as to be pushed by the operation lever through a threaded tube which is in threaded engagement with an adjusting screw secured to the rear face of the pad. A return spring is connected at one end to the operation lever and at its other end to the adjusting screw through a one-way clutch.

8 Claims, 5 Drawing Figures

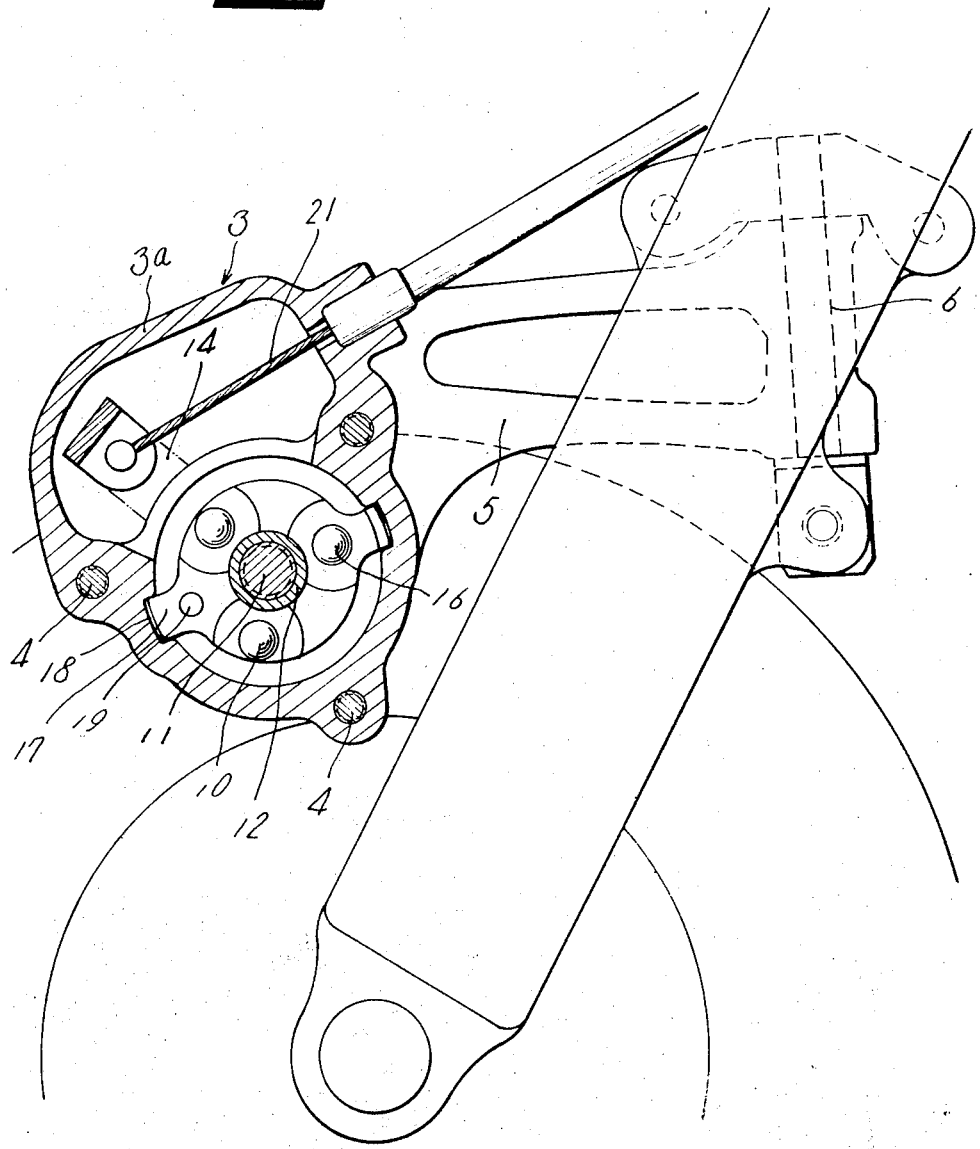

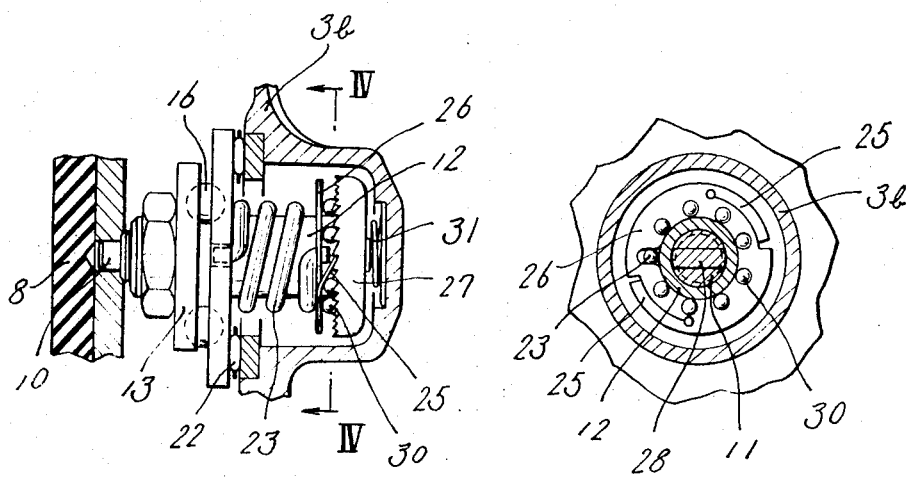
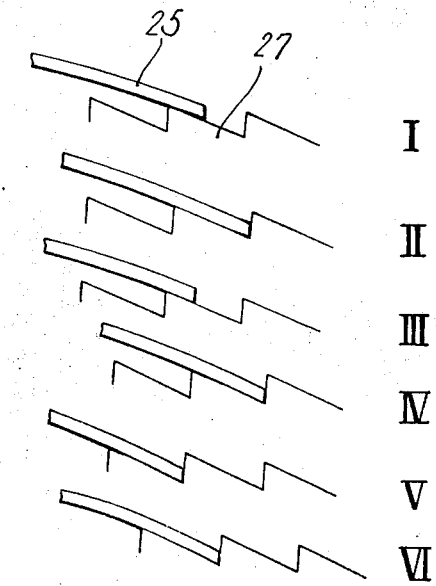

3,789,959

APPARATUS FOR AUTOMATIC PAD ADJUSTMENT IN DISK BRAKES

BRIEF SUMMARY OF THE INVENTION

This invention relates to disk brake apparatus which incorporates an adjustment means to automatically cause a movable pad to be advanced for adjustment in accordance with the wear thereof.

The invention is specifically directed to a disk brake of the type in which a caliper member includes legs straddling a brake disk and respectively provided with a stationary pad and a movable pad, the latter being arranged to be advanced by being pushed upon pivoting of an operation lever. The invention is characterized in that the movable pad is so arranged as to be pushed by the operation lever through a threaded tube which is in threaded engagement with an adjusting screw secured to the rear face of the movable pad, one end of a return spring being connected to the operation lever while its other end is connected to the adjusting screw through a one-way clutch.

BRIEF DESCRIPTION OF THE DRAWING

FIG. 2 is a sectional view taken along line II — II in FIG. 1, FIG. 3 is a sectional view taken along line III — III in FIG. 1, FIG. 4 is a sectional view taken along line IV — IV in FIG. 3, and FIG. 5 is a diagram showing in stages I — VI the manner of the feed operation of a ratchet wheel of an adjusting device of the brake apparatus.

DETAILED DESCRIPTION

Figure 1:
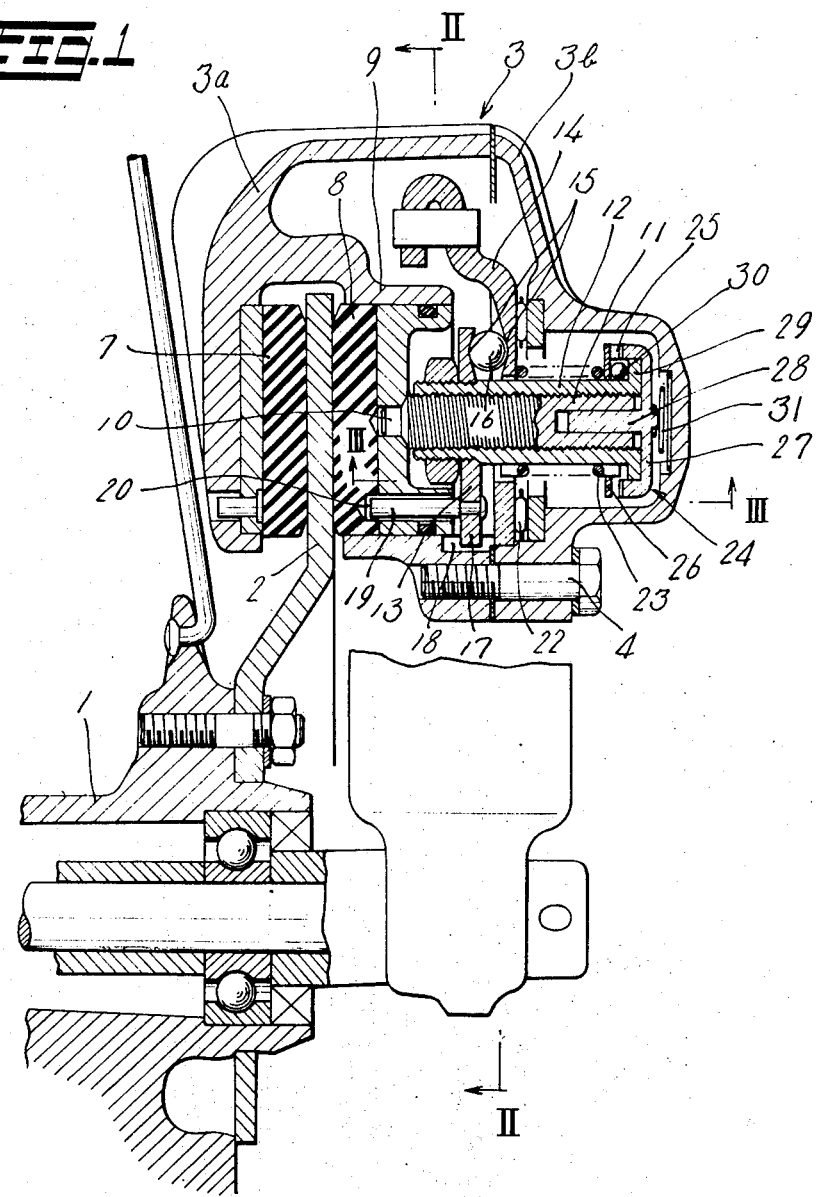
FIG. 1 is a sectional side view of one embodiment of brake apparatus according to the invention.

Referring to the drawings, numeral 1 denotes a wheel axle and numeral 2 denotes a brake disk secured thereto. A caliper member 3 extends over the disk 2. The caliper member 3 comprises right half and left half portions 3a and 3b, respectively, secured together by means of bolts 4 and member 3 is swingably supported on a shaft 6 (FIG. 2) on a portion of a car body at the free end of an arm member 5 extending from the back of caliper member 3. On opposite inner surfaces of the caliper member 3, there are mounted a stationary pad 7 on one side and a movable pad 8 on the other side, the movable pad 3 being slidably supported within a surrounding guide tube 9. The pads straddle the disk 2.

At the back side of the movable pad 8, there are provided a longitudinally extending adjusting screw 11, which has a small diameter portion 10 at its free end mounted in the pad 8, and a threaded tube 12 which is in externally threaded engagement on the adjusting screw 11. Additionally there are provided a pressure receiving plate 13 secured to the outer periphery of the front portion of the threaded tube 12 and an operation lever 14 loosely mounted on the threaded tube 12 behind plate 13. The pressure receiving plate 13 and the operation lever 14 are provided on their facing surfaces with a plurality of respective pairs of conical concavities 15, and a ball 16 is interposed between each pair of concavities. Thus, if the operation lever 14 is turned, the pressure receiving plate 13 will cause, through the action of balls 16, axial movement of tube 12 and the adjusting screw 11 therein, thereby urging pad 8 against disk 2. By the cooperation of pad 8 with the stationary pad 7, the brake disk 2 is clamped therebetween. The pressure receiving plate 13 is prevented from being rotated by the construction in which at least one outer peripheral claw member 17 is formed on plate 13 and is in engagement in a longitudinally extending groove 18 in the inner surface of the caliper member 3. The movable pad 8 is also prevented from being rotated by the construction in which a pin 19 longitudinally projecting from the plate 13 is inserted in a recess 20 in the movable pad 8. The operation lever 14 is connected through an operation wire 21 to an outside manual operation member (not illustrated) so as to be operated by the operation member. Numeral 22 denotes a thrust bearing provided on the rear surface of the operation lever 14 and the thrust bearing acts to facilitate turning of the lever 14.

A coil-shaped return spring 23 has one end connected to the operation lever 14 and surrounds the threaded tube 12 behind the lever 14, the other end of the spring 23 being connected to the adjusting screw 11 through a one-way clutch 24. The one-way clutch 24 comprises a pawl plate 26 having feed pawls 25 rising therefrom and a ratchet wheel 27 in engagement therewith. The clutch 24 is connected by the pawl plate 26 to the spring 23 and is in engagement via a square shaft 28 of the ratchet wheel 27 with the rear end portion of the screw 11 so that the ratchet wheel 27 is slidable in relation to the screw 11 but is rotatable therewith.

The pawl plate 26 is supported at the rear side thereof through balls 30 by a flange 20 formed at the rear end of the threaded tube 12, and the ratchet wheel 27 is subjected at its rear surface to the action of a spring 31 so as to be pressed against the flange 29.

The operation of the brake apparatus will next be explained hereafter.

If the operation lever 14 is turned from the position as shown in FIGS. 1 and 2 to the right in FIG. 2, this causes the threaded tube 12 to be advanced to the left in FIG. 1, through the intermediary of balls 16 and the pressure receiving plate 13 while the return spring 23 is compressed. The movable pad 8 is advanced with tube 12 and at the same time the reaction force thereof acts on the stationary pad 7 through the thrust bearing 22 and the caliper member 3 and thereby the pad 7 is moved to the right in FIG. 1, so that the brake disk 2 is held under pressure between the two pads 7, 8 whereby a braking operation is applied to the wheel axle 1. If, then the operation lever 14 is released from the operation force, the lever 14 is returned to its original position as shown in FIG. 2 and the other parts are also returned to their original positions, and this is repeated as occasion demands. During this operation, the pawl plate 26 is moved with the operation lever 14 through the spring 23 and repeats its reciprocating turning movements in accordance with the reciprocating turning movements of the operation lever 14. If, in this case, the pads have worn, the stroke of the operation lever 14 is increased in accordance with the wear, so that the stroke of pawl plate 26 is also increased (in its turning movement) and as a result thereof the ratchet wheel 27 is given a feed rotating movement and thereby the adjusting screw 11 is advanced by being rotated and the movable pad 8 is given an advance movement for adjustment in accordance with the amount of the wear of the pads. The relation between the increase of the stroke of advance movement of the pawl plate 26, that is of the feed pawl 25 in accordance with the increase of wear of the pads and the feed rotating movement of the ratchet wheel 27 in accordance therewith is shown in FIG. 5 at stages I to VI. Namely, the feed pawl 25 repeatedly is advanced and then returned to its initial position, and during this period the advancing stroke thereof is gradually increased in accordance with the amount of pad wear and the ratchet wheel 27 is fed by pushing, and if the feed amount thereof exceeds one tooth pitch of the ratchet wheel 27, the feed pawl 25 is transferred to the next tooth, and this is repeated in succession.

In the course of a braking operation by the inclination of the operation lever 14, when the movable pad 8 is in pressure contact with the disk 2, the reaction force thereof acts on the adjusting screw 11 in the longitudinal direction thereof and a strong frictional force is generated between the adjusting screw 11 and the threaded tube 12, and thereby the ratchet wheel 27 is also locked. Even if, under this condition, the operation lever 14 is further turned strongly, this results only in deflection of the return spring 23, and there is no further feed rotating movement imparted to the ratchet wheel 27.

Thus, according to this invention, upon operation of the operation lever, the movable pad is automatically given a feed adjustment in accordance with the amount of wear of the pads and is always brought to a proper adjusted condition, and thus difficulties in operation in the conventional manual adjustment type can be eliminated and it is always possible to obtain a proper operation. Additionally, any excess turning of the operation lever is absorbed in the return spring so that any unnecessary excess adjustment is not imparted to the movable pad.

What is claimed is:

1. Disk brake apparatus comprising a brake disk, a caliper member including two legs straddling said disk on opposite sides thereof, a first pad fixed on one leg, a second pad displaceably supported on the second leg for movement towards and away from the brake disk, a pivotal operation lever, and means coupling said lever and said second pad (a) for applying said second pad against the disk when the lever is pivoted during a brake operation and (b) for automatically adjusting the position of the second pad relative to the brake disk to compensate for wear of the pads, the latter means comprising an adjusting screw secured to said second pad, a tube threaded on said screw and undergoing displacement upon pivoting of the operation lever to advance the tube and screw towards the disk and cause said second pad to contact said disk, one-way clutch means between said tube and screw for advancing the screw relative to the tube in the course of braking when the pads are worn, and elastic means connecting the operation lever and said one-way clutch means for transmitting the turning movement of the operation lever to the one-way clutch means, said one-way clutch means comprising a pawl plate connected to said elastic means to follow movement of the operation lever, and a ratchet wheel connected to said adjusting screw for rotation therewith but capable of relative axial movement, said ratchet wheel being provided with teeth and facing said pawl plate such that the latter turns the ratchet wheel and the adjusting screw.

2. Disk brake apparatus as claimed in claim 1 wherein said pawl plate includes pawl members raised therefrom and riding on the teeth of the ratchet wheel.

3. Disk brake apparatus as claimed in claim 1 comprising ball means between said threaded tube and said pawl plate for supporting the pawl plate on the tube.

4. Disk brake apparatus as claimed in claim 1 wherein said elastic means comprises a coil spring surrounding said tube and connected at respective ends to said operation lever and said pawl plate.

5. Disk brake apparatus as claimed in claim 1 comprising a spring acting on said ratchet wheel to urge the same axially against said tube.

6. Disk brake apparatus comprising a brake disk, a caliper member including two legs straddling said disk on opposite sides thereof, a first pad fixed on one leg, a second pad displaceably supported on the second leg for movement towards and away from the brake disk, a pivotal operation lever, and means coupling said lever and said second pad (a) for applying said second pad against the disk when the lever is pivoted during a brake operation and (b) for automatically adjusting the position of the second pad relative to the brake disk to compensate for wear of the pads, the latter means comprising an adjusting screw secured to said second pad, a tube threaded on said screw and undergoing displacement upon pivoting of the operation lever to advance the tube and screw towards the disk and cause said second pad to contact said disk, one-way clutch means between said tube and screw for advancing the screw relative to the tube in the course of braking when the pads are worn, and elastic means connecting the operation lever and said one-way clutch means for transmitting the turning movement of the operation lever to the one-way clutch means, comprising means connecting the threaded tube and the second pad for common rotation but permitting relative axial movement therebetween.

7. Disk brake apparatus comprising a brake disk, a caliper member including two legs straddling said disk on opposite sides thereof, a first pad fixed on one leg, a second pad displaceably supported on the second leg for movement towards and away from the brake disk, a pivotal operation lever, and means coupling said lever and said second pad (a) for applying said second pad against the disk when the lever is pivoted during a brake operation and (b) for automatically adjusting the position of the second pad relative to the brake disk to compensate for wear of the pads, the latter means comprising an adjusting screw secured to said second pad, a tube threaded on said screw and undergoing displacement upon pivoting of the operation lever to advance the tube and screw towards the disk and cause said second pad to contact said disk, one-way clutch means between said tube and screw for advancing the screw relative to the tube in the course of braking when the pads are worn, and elastic means connecting the operation lever and said one-way clutch means for transmitting the turning movement of the operation lever to the one-way clutch means, the means coupling the lever and said second pad comprising a pressure plate secured to said tube and supported by the caliper member for relative axial movement while being held against relative rotation, and ball means interposed between the operating lever and said pressure plate for producing axial movement of the tube when the operating lever is pivoted.

8. Disk brake apparatus as claimed in claim 7 wherein said pressure plate and operating member are provided with opposed pairs of conical concavities, said ball means comprising a ball in each pair of concavities.

* * * * *